United States Patent [19]
Kim

[11] Patent Number: 6,151,207
[45] Date of Patent: Nov. 21, 2000

[54] STRUCTURE FOR PROTECTING ELECTRONIC SYSTEMS FROM IMPACT AND PORTABLE COMPUTER WITH SUCH A STRUCTURE

[75] Inventor: Tae-Yong Kim, Seoul, Rep. of Korea

[73] Assignee: SamSung Electronics Co., Ltd., Suwon, Rep. of Korea

[21] Appl. No.: 09/201,136

[22] Filed: Nov. 30, 1998

[30] Foreign Application Priority Data

Nov. 28, 1997 [KR] Rep. of Korea ...................... 97-64114

[51] Int. Cl.$^7$ ....................................................... G06F 1/16
[52] U.S. Cl. .............................. 361/681; 361/681; 349/58
[58] Field of Search ................................. 361/681; 349/58

[56] References Cited

U.S. PATENT DOCUMENTS

| | | |
|---|---|---|
| 4,089,045 | 5/1978 | Mars . |
| 4,158,266 | 6/1979 | Gilmour . |
| 5,002,368 | 3/1991 | Anglin . |
| 5,150,231 | 9/1992 | Iwamoto et al. . |
| 5,363,227 | 11/1994 | Ichikawa et al. . |
| 5,479,285 | 12/1995 | Burke . |
| 5,486,942 | 1/1996 | Ichikawa et al. . |
| 5,535,092 | 7/1996 | Bang . |
| 5,539,552 | 7/1996 | Desai et al. . |
| 5,659,376 | 8/1997 | Uehara et al. ............................ 349/58 |
| 5,706,168 | 1/1998 | Erler et al. . |
| 5,710,607 | 1/1998 | Iwamoto et al. . |
| 5,808,707 | 9/1998 | Niibori et al. . |
| 5,831,816 | 11/1998 | Johns et al. . |
| 5,838,401 | 11/1998 | Uehara . |
| 5,905,550 | 5/1999 | Ohgami et al. ............................ 349/58 |
| 6,002,582 | 12/1999 | Yeager et al. ............................ 361/681 |

*Primary Examiner*—Leo P. Picard
*Assistant Examiner*—Yean-Hsi Chang
*Attorney, Agent, or Firm*—Robert E. Bushnell, Esq.

[57] ABSTRACT

A structure for protecting impact-sensitive elements of electronic systems from external impact is used to protect electronic systems, such as portable computer, from impact. The above structure consists of a first member, a second member assembled with the first member into a single body, and a third member interposed between the first and second members and having a depressed seat on a surface facing the first member. A fourth member is seated in the depressed seat of the third member. A locking member assembles the first and second members into a single body while passing through the third member interposed between the first and second members, thus allowing the third member along with the fourth member to be supported by the first and second members. The above structure thus prevents impact energy from being transmitted to or damaging the fourth member when the system is impacted.

23 Claims, 9 Drawing Sheets

STRUCTURE FOR PROTECTING ELECTRONIC SYSTEMS FROM IMPACT AND PORTABLE COMPUTER WITH SUCH A STRUCTURE

CLAIM OF PRIORITY

This application makes reference to, incorporates the same herein, and claims all benefits accruing under 35 U.S.C. §119 from an application for STRUCTURE FOR PROTECTING ELECTRONIC SYSTEMS FROM IMPACT AND PORTABLE COMPUTER WITH SUCH A STRUCTURE earlier filed in the Korean Industrial Property Office on Nov. 28, 1997 and there duly assigned Ser. No. 64114/1997.

BACKGROUND OF THE INVENTION

1. Technical Field

The present invention relates, in general, to a structure for protecting electronic systems from impact and a portable computer with such a structure. More particularly, the invention relates to a structure capable of effectively protecting impact-sensitive elements of electronic systems from external impact, and to a portable computer provided with such a structure for protecting its flat display panel from impact.

2. Related Art

In recent years, varieties of electronic systems have been proposed and used in accordance with developments in the electronic industry. Particularly, the rapid technological development in the information and communication industry has resulted in the provision of portable electronic systems which allow users to communicate with each other or with a main station while out of the home or office.

Such portable computers are typically classified into several types: laptop computers, notebook computers and palmtop computers. Typically, such computers comprise a main body and a display body, and are designed to make it easy for the user to transport them when the user is away from home or office. However, since such computers are frequently transported, they are very likely to undergo impact, with consequent damage to the sensitive elements contained in the computer, notably, the display panel in the display body thereof.

Therefore, there has been and is a need to develop a structure which will protect such computers, their electronic systems and their sensitive elements from damage due to impact.

The following patents each discloses features in common with the present invention but do not teach or suggest the recited structure of the present invention: U.S. Pat. No. 5,479,285 to Burke, entitled Liquid Crystal Device With AN Isotropic Shock Mounting And Gasket, U.S. Pat. No. 5,486,942 to Ichikawa et al., entitled Method Of Mounting A Liquid Crystal Display Employing Shock Mounts With Receiving Slots, U.S. Pat. No. 5,808,707 to Niibori et al., entitled Display Apparatus, U.S. Pat. No. 5,831,816 to Johns et al., entitled Shock Mounting Assembly For Use With Flat Panel Displays, U.S. Pat. No. 5,838,401 to Uehara, entitled Impact Resistant Crystal Apparatus U.S. Pat. No. 5,150,231 to Iwamoto et al., entitled Impact Resistant Ferroelectric Liquid Crystal Apparatus, U.S. Pat. No. 5,636,227 to Ichikawa et al., entitled Liquid Crystal Display Mounting Structure, U.S. Pat. No. 5,710,607 to Iwamoto et al., entitled Impact Resistant Liquid Crystal Apparatus, U.S. Pat. No. 5,659,376 to Uehara et al., entitled Liquid Crystal Display Apparatus In Which A Non-Transmissive Elastic Member Surrounding A Display Area Is Disposed Between A Viewer Side Light Transmissive Plate And The LCD, U.S. Pat. No. 5,535,092 to Bang, entitled Apparatus For Reducing Impacts On A Hard Disk Assembly, U.S. Pat. No. 5,706,168 to Erler et al., entitled Impact-Resistant Notebook Computer Having Hard Drive Mounted On Shock-Isolating Mounting Bridge And Impact Attenuating Covering, U.S. Pat. No. 5,539,552 to Desai et al., entitled Protective Member For Display System Having 99 UV Light Blocking Ability And Improved Thermal Coefficient Of Expansion, U.S. Pat. No. 5,002,368 to Anglin, entitled Liquid Crystal Display Mounting Structure, U.S. Pat. No. 4,158,266 to Gilmour, entitled Shock Absorbent Display Mounting Apparatus And Method, and U.S. Pat. No. 4,089,045 to Mars, entitled Plasma Panel Mounting Frame.

SUMMARY OF THE INVENTION

Accordingly, the present invention has been made while keeping in mind the above problems, and an object of the present invention is to provide an impact protection structure which is capable of effectively protecting impact-sensitive elements of electronic systems from external impact.

Another object of the present invention is to provide a portable computer which is provided with such an impact protection structure for protecting a flat display panel from impact.

In order to accomplish the above objects, the primary embodiment of the present invention has a structure for protecting electronic systems from impact, comprising: a first member; a second member assembled with the first member into a single body; a third member interposed between the first and second members and having a depressed seat on a surface facing the first member; a fourth member seated in the depressed seat of the third member; and a locking member assembling the first and second members into a single body while passing through the third member interposed between the first and second members. This allows the third member along with the fourth member to be supported by the first and second members, whereby the structure prevents impact energy from being transmitted to or damaging the fourth member when the system is impacted.

The above structure further comprises a first cushion member having an elasticity and provided on the third member at a position around the locking member. The first cushion member is brought into close contact with the interior surfaces of the first and second members at both ends thereof, respectively, and allows the locking member to pass through when assembling the first and second members into a single body, with the third member being interposed between the first and second members. The first cushion member comprises: an axial hole allowing the locking member to pass through; an annular groove formed on an external surface of the first cushion member, thus sectioning the cushion member into upper and lower portions and allowing the cushion member to be fitted in a locking hole of the third member at the annular groove; a first contact part formed by the upper portion of the cushion member and having a larger outer diameter than an inner diameter of the locking hole of the third member, the first contact part being brought into close contact with the interior surface of the first member; and a second contact part formed by the lower portion of the cushion member and having a larger outer diameter than the inner diameter of the locking hole of the third member, the second contact part being brought into close contact with the interior surface of the second member.

A pressure extension extends a certain distance from the interior surface of the first member toward the second member at a position around an edge of the depressed seat of the third member, thus stably and firmly seating the fourth member in the depressed seat. The first and second members form a housing of the electronic system. The third member is made of a plastic material. The structure further comprises a second cushion member having a predetermined elasticity and thickness, and positioned on a bottom surface of the depressed seat of the third member. Thus, the second cushion member elastically supports the fourth member in the depressed seat. The locking member is inserted into the first member from the outside of the first member, and passes through the third member prior to being locked to the second member.

Another embodiment of the present invention provides a portable computer provided with a structure for protecting a display panel from impact, comprising: a front housing forming a front frame of a display body of the computer; a back housing assembled with the front housing into a single body and forming a rear frame of the display body; an impact protection seat member made of a plastic material and interposed between the front and back housings, the seat member being provided with a depressed seat on a surface facing the front housing so as to seat the display panel; and a locking member assembling the front and back housings into a single body while passing through the seat member interposed between the front and back housings, thus allowing the seat member along with the display panel to be supported by the front and back housings. Thereby, the structure prevents impact energy from being transmitted to or damaging the display panel when the system is impacted.

The portable computer further comprises a first cushion member having an elasticity and provided on the seat member at a position around the locking member, the first cushion member being brought into close contact with the interior surfaces at both ends of the front and back housings, respectively, and allowing the locking member to pass through when assembling the front and back housings into a single body with the seat member being interposed between the front and back housings. The portable computer also has a second cushion member having a predetermined elasticity and thickness, and positioned on a bottom surface of the depressed seat of the seat member, thus elastically supporting the display panel in the depressed seat. In addition, an adhesive layer having a predetermined thickness is formed along a gap between the side wall of the depressed seat and the edge of the display panel thus stably and firmly seating the display panel in the depressed seat.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
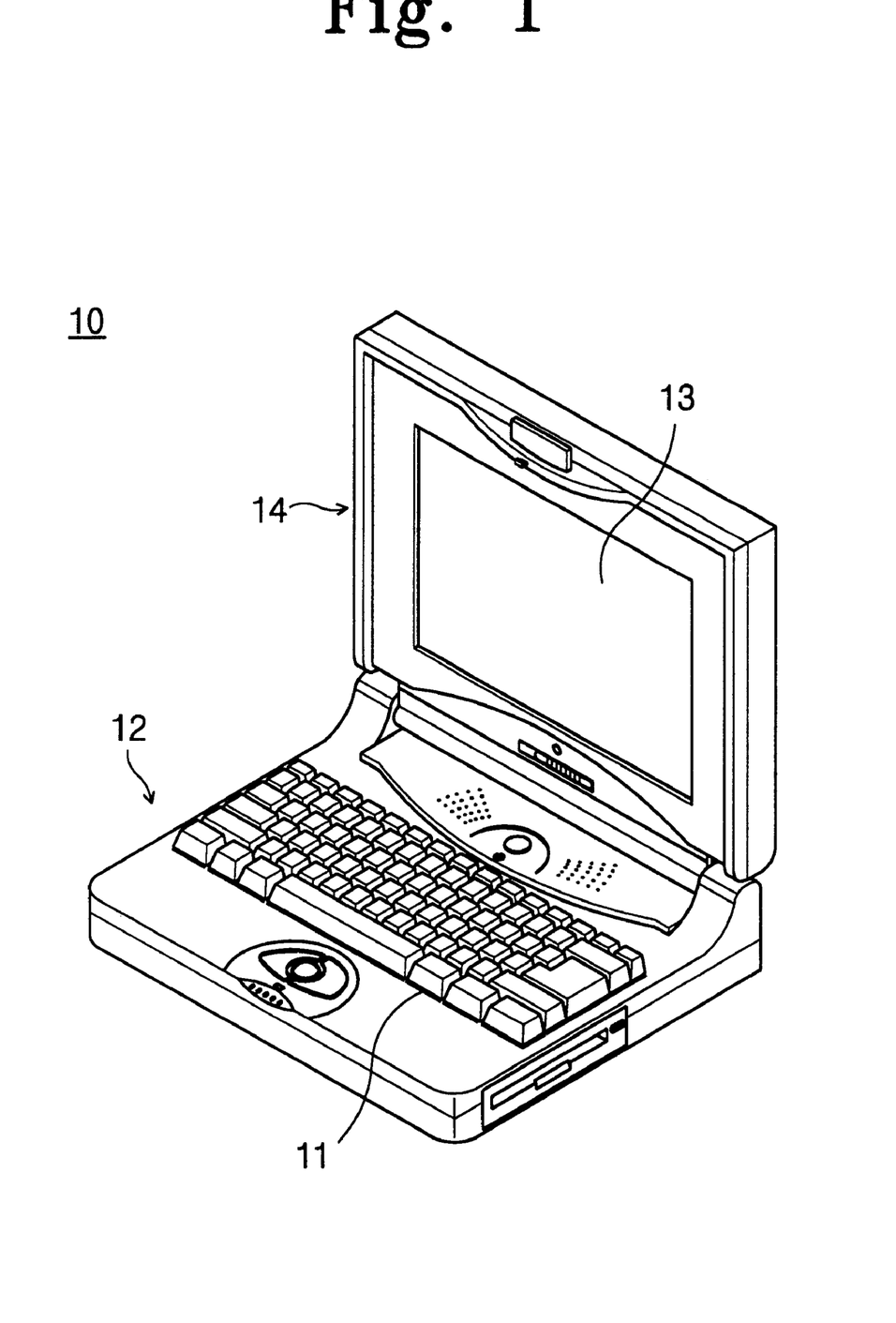
FIG. 1 is a perspective view showing the configuration of a portable computer.

The configuration of a portable computer 10 is shown in FIG. 1. As shown in the drawing, the portable computer 10 comprises a main body 12 and a display body 14. Varieties of electronic elements, such as a main board (not shown), are installed in the main body 12, while a keyboard 11 is arranged on the top surface of the main body 12. A flat display panel 13 is set on the display body 14 and is hinged to the main body 12 in such a way that the display body 14 is selectively closed on the main body 12 with the flat display panel 13 being opposed to the keyboard 11 of the main body 12.

Such a portable computer 10 is designed to allow a user to carry the computer 10 while out of the home or office. Therefore, it is necessary to consider size and weight of the computer 10 when designing such portable computers. In addition, portable computers also have to be designed to effectively resist impact. Particularly, when the portable computer uses a flat display panel, such as an LCD (liquid crystal display) monitor, an electrooptic display panel or a plasma display panel, it is inevitably necessary to provide a structure for protecting such a flat display panel from impact.

Figure 2:
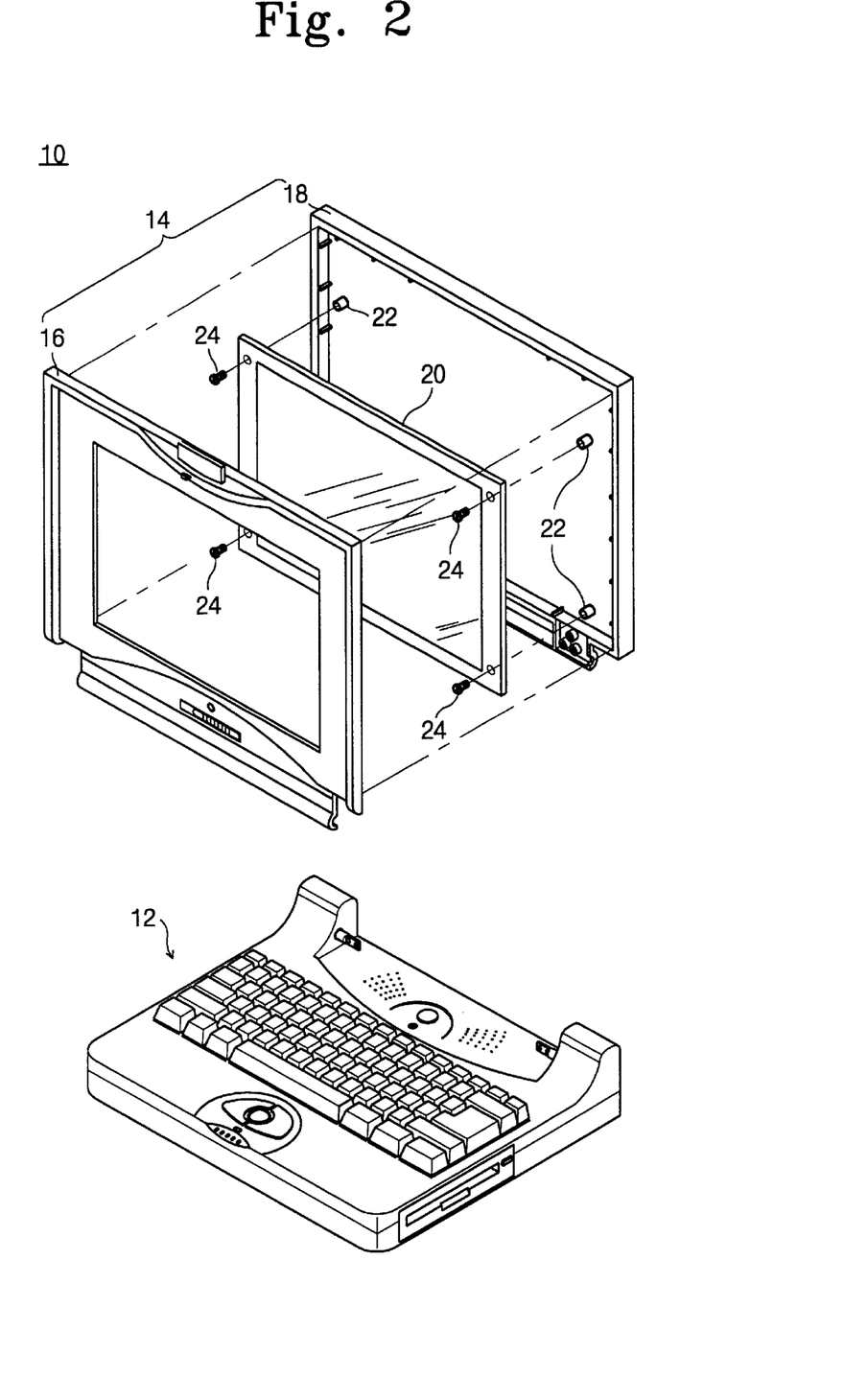
FIG. 2 is an exploded perspective view showing a typical structure for setting a flat display panel in the display body of such a portable computer.

FIG. 2 is an exploded perspective view showing a typical structure for setting a flat display panel in the display body of a portable computer.

As shown in the drawing, the structure for setting a flat display panel 20 in the display body 14 of a portable computer 10 comprises two housings: front housing 16 and back housing 18. A plurality of bosses 22 are provided on the interior surface of the back housing 18 so that the display panel 20 is firmly screwed to the bosses 22 using a plurality of set screws 24. Thereafter, the front housing 16 is screwed to the back housing 18 with the display panel 20 being interposed and firmly set between the housings 16 and 18. However, such a typical structure has to be provided with both a plurality of interiorly threaded bosses 22 on the back housing 18 and a plurality of set screws 24 used for screwing the display panel 20 to the back housing 18 of the display body 14.

In addition, such a structure complicates the process for assembling the display body 14 since the display panel 20 has to be screwed to the display body 14. For example, the display body 14 may be broken at the bosses 22 when either the bosses 22 have a structural fault or the screws 24 are not precisely driven into the bosses 22.

Another problem experienced in the above structure resides in the fact that, when a portable computer 10 with such a structure is impacted, the impact energy is directly applied to the flat display panel 20 through the bosses 22 and screws 24.

Figure 3:
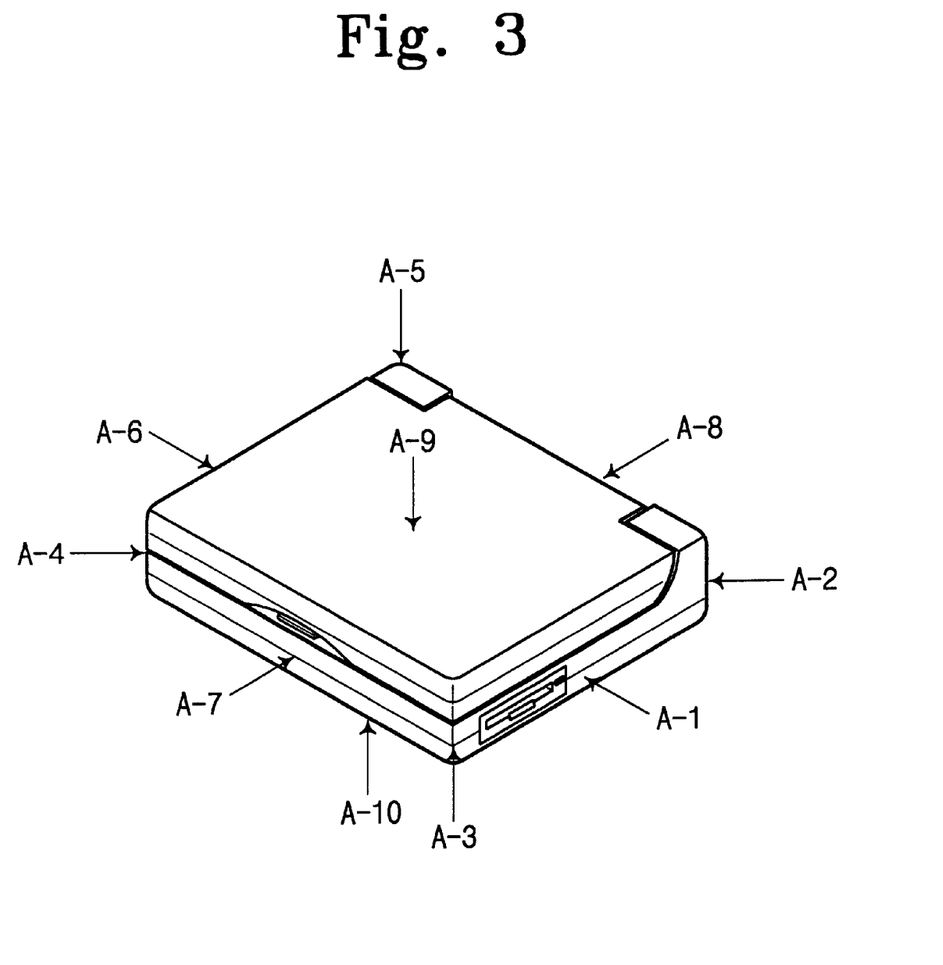
FIG. 3 is a perspective view of a portable computer with a flat display panel being set in the display body of the computer using a typical structure, showing the portions of the computer at which the impact resistance is tested.

FIG. 3 is a perspective view of a portable computer with the display body being closed on the main body, showing the portions of the computer at which impact resistance is tested.

In the impact test, a portable computer having a magnesium (Mg) die-cast housing, and having a weight of 3.2 kg, and being free from being painted, is used. In order to measure the drop strength, the portable computer is freely dropped from a predetermined height onto a concrete surface. As shown in FIG. 3, the portable computer is tested on six faces and four sides thereof during the impact test. The test results are given in Table 1.

TABLE 1

Impact test results of a portable computer provided with a typical impact protection structure

| Nos. of tested portions | impact test results |
| --- | --- |
| A-1 (face) | breakage of bosses |
| A-2 (face) | breakage of bosses |
| A-3 (face) | breakage of bosses |
| A-4 (face) | damage of display panel |
| A-5 (face) | damage of display panel |
| A-6 (face) | free from any damage |
| A-7 (face) | damage of display panel |
| A-8 (face) | damage of display panel |
| A-9 (face) | free from any damage |
| A-10 (face) | free from any damage |

As illustrated in Table 1, a portable computer provided with a typical structure for setting a flat display panel in the display body of the computer cannot effectively resist impact at the screw bosses of the display body when the computer is freely dropped onto a concrete surface.

Therefore, when an impact-sensitive electronic system, such as a portable computer having impact-sensitive elements (for example, a flat display panel set in the computer using a typical structure) is impacted, it is almost impossible to protect the impact-sensitive elements from the impact energy.

Figure 4:
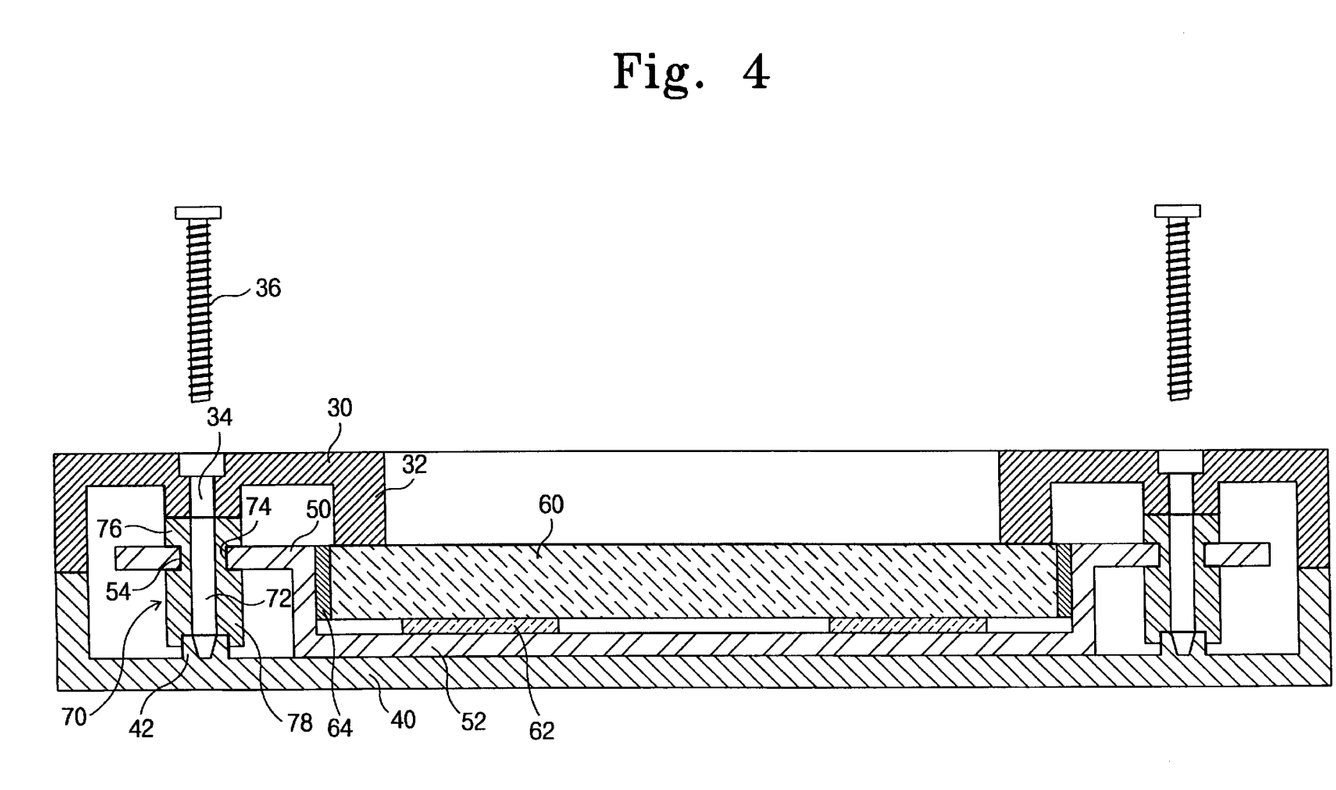
FIG. 4 is a sectional view showing the construction of an impact protection structure for electronic systems in accordance with a first embodiment of the present invention.

FIG. 4 is a sectional view showing the construction of an impact protection structure for electronic systems in accordance with a first embodiment of the present invention. As shown in the drawing, the impact protection structure of this invention is used for effectively protecting the fourth member 60 of an electronic system from impact. In the electronic system, a first member 30 and second member 40 form a housing of the system, while the fourth member 60 is set in the housing formed by the first member 30 and second member 40. In such a case, the impact protection structure of this invention is used for protecting the fourth member 60 from impact.

In order to form the impact protection structure of this invention in the system, a third member 50, seating the fourth member 60 and assembled with the first member 30 and second member 40, is provided in the system. That is, the present invention provides an impact protection structure wherein the third member 50 is capable of holding the fourth member 60 in the system while effectively isolating the fourth member 60 from both the first member 30 and second members 40. The fourth member 60 is seated in a depressed protection seat 52 of the third member 50 prior to being set in the housing formed by the first member 30 and second member 40.

After interposing the third member 50 with the fourth member 60 between the first member 30 and second member 40, the members 30 and 40 are assembled into a single housing using a plurality of locking members, such as set screws 36. That is, the third member 50 is held in its place in the system by being compressed by the members 30 and 40 screwed to each other into a single body. Two through holes 34 and 54 are formed on the first member 30 and third member 50, respectively, in such a way that the two holes 34 and 54 are aligned with each other. A boss 42 is formed on the second member 40 in such a way that the boss 42 is aligned with the through holes 34 and 54 of the members 30 and 50, respectively. The screw 36, passing through the holes 34 and 54, is fully screwed into the boss 42.

A pressure extension 32 extends from the interior surface of the first member 30 toward the second member 40 to a position in the vicinity of the edge of the protection seat 52 of the third member 50, thus stably and firmly seating the fourth member 60 in the protection seat 52. In the present invention, the third member 50 may be made of a plastic material suitable for absorbing impact. Alternatively, the third member 50 may be made of sheet metal without the functioning of this invention.

When the system with such an impact protection structure is impacted, the structure effectively prevents impact energy from being applied to the fourth member 60, thus protecting the member 60 from breakage.

In order to further improve the impact protection effect of the above structure, a plurality of first cushion members 70, having a cylindrical configuration, are provided in the system at positions around the locking members or the set screws 36. At said positions, the members 30 and 40 are assembled into a single body by the set screws 36, with the third member 50 being closely interposed between the members 30 and 40. Each of the first cushion members 70 is set on the third member 60 at a position where the screw passes through the third member 60 and comes into close contact with the members 30 and 40 at both ends thereof. When the members 30 and 40 are assembled into a single body through a screwing process, the locking members or the set screws 36 pass through the first cushion members 70.

In a detailed description, each of the first cushion members 70 has an axial hole 72. The axial hole 72 of each cushion member 70 is aligned with an associated hole 34 of the first member 30 and allows a set screw 36 to pass through it. The first cushion member 70 also has an annular groove 74 at its external surface, thus fitting into the hole 54 of the third member 50 at the groove 74. The upper portion of the first cushion member 70 forms a first contact part 76 which has a larger outer diameter than the inner diameter of the hole 54 of the third member 50. At the top end of the first contact part 76, the cushion member 70 is brought into close contact with the interior surface of the first member 30. The lower portion of the first cushion member 70 forms a second contact part 78 which has a larger outer diameter than the inner diameter of the hole 54 of the third member 50. At the lower end of second contact part 78, the cushion member 70 is brought into close contact with the interior surface of the second member 40. In the present invention, the first cushion member 70 may be formed of rubber, while the configuration of the contact parts 76 and 78 may be freely designed to meet the configuration of the members 30 and 40 which, respectively, come into contact with the contact parts 76 and 78. Since the second member 40 has a plurality of bosses 42, the second contact part 78 of each of the first cushion members 70 preferably has a configuration suitable for engagement with each boss 42. The third member 50 is elastically supported by the cushion members 70 so that it is possible to effectively intercept impact energy applied to the fourth member 60, seated in the third member 50, when the system is impacted.

On the other hand, in order to further improve the impact protection effect of the structure, a second cushion member 62, having a pad configuration with a predetermined elasticity and thickness, is positioned on the bottom surface of the protection seat 52 of the third member 50, and cooperates with the first cushion members 70 to effectively protect the fourth member 60 from impact. That is, the fourth member 60 is seated in the protection seat 52 while being cushioned by the second cushion member 62 positioned between the bottom surface of the seat 52 and the fourth member 60. An adhesive layer 64, having a predetermined thickness, may be formed along a gap between the side wall of the protection seat 52 and the edge of the fourth member 60, thus stably and firmly seating the member 60 in the seat 52. Both the second cushion member 62 and the adhesive layer 64 serve to stably position the fourth member 60 in the third member 50.

Figure 5:
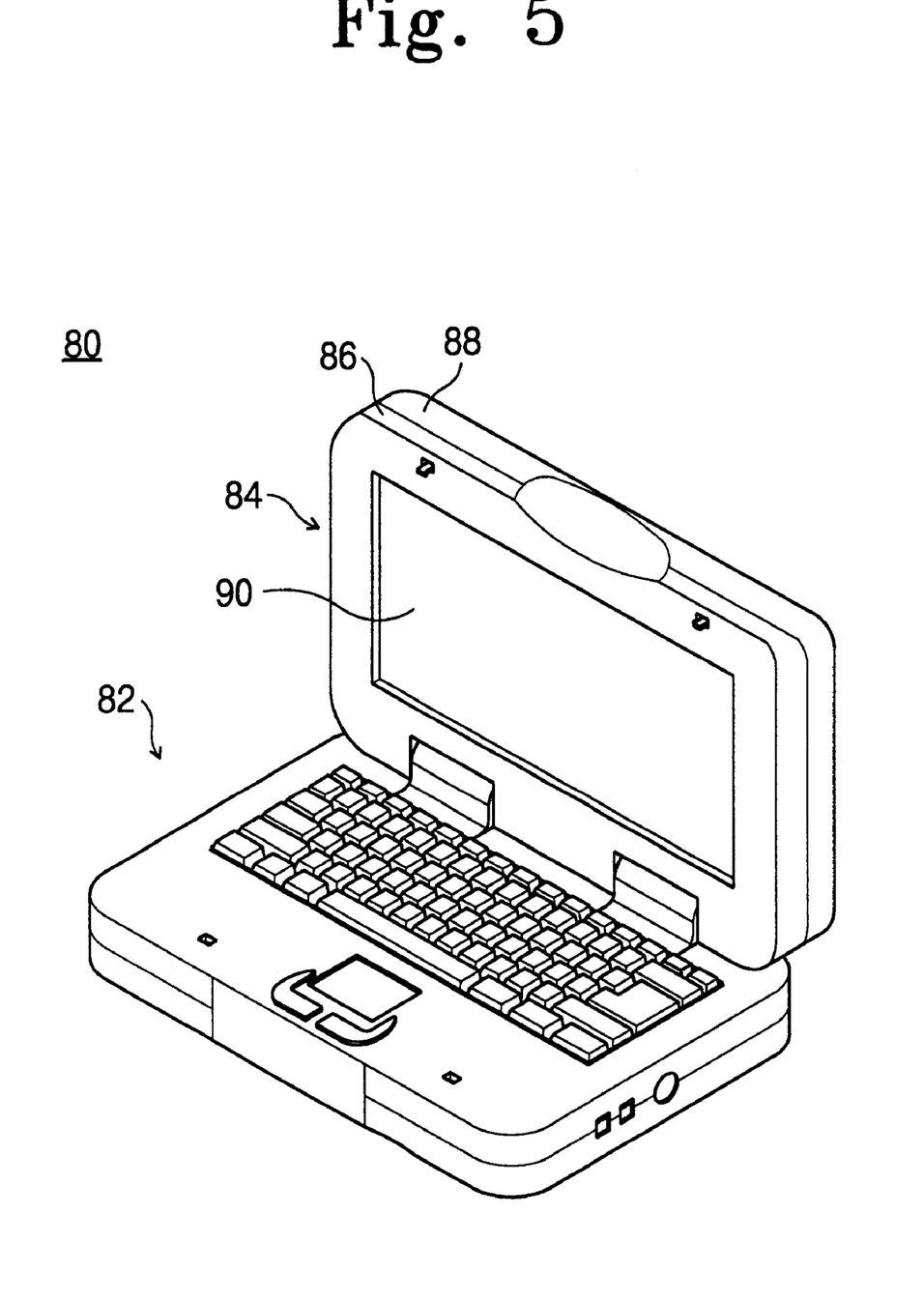
FIG. 5 is a perspective view of a portable computer provided with the impact protection structure of this invention.

FIG. 5 is a perspective view of a portable computer provided with the impact protection structure of this invention.

As shown in FIG. 5, the portable computer 80 is carried by a user when the user is out of the home or office so that it is necessary to use an impact protection structure in the computer 80 to protect the computer 80 from impact. Particularly, the display body 84, hinged to the main body 82 and provided with a flat display panel 90, has to be almost completely protected from impact when the computer 80 is impacted. That is, such a portable computer 80 has to be designed to effectively intercept and absorb impact energy which would otherwise be applied to the display panel 90 when the computer 80 is carelessly impacted. Of course, it should be understood that other impact-sensitive parts of the computer 80, in addition to the display panel 90, have to be supported by an impact protection structure of this invention.

Figure 6:
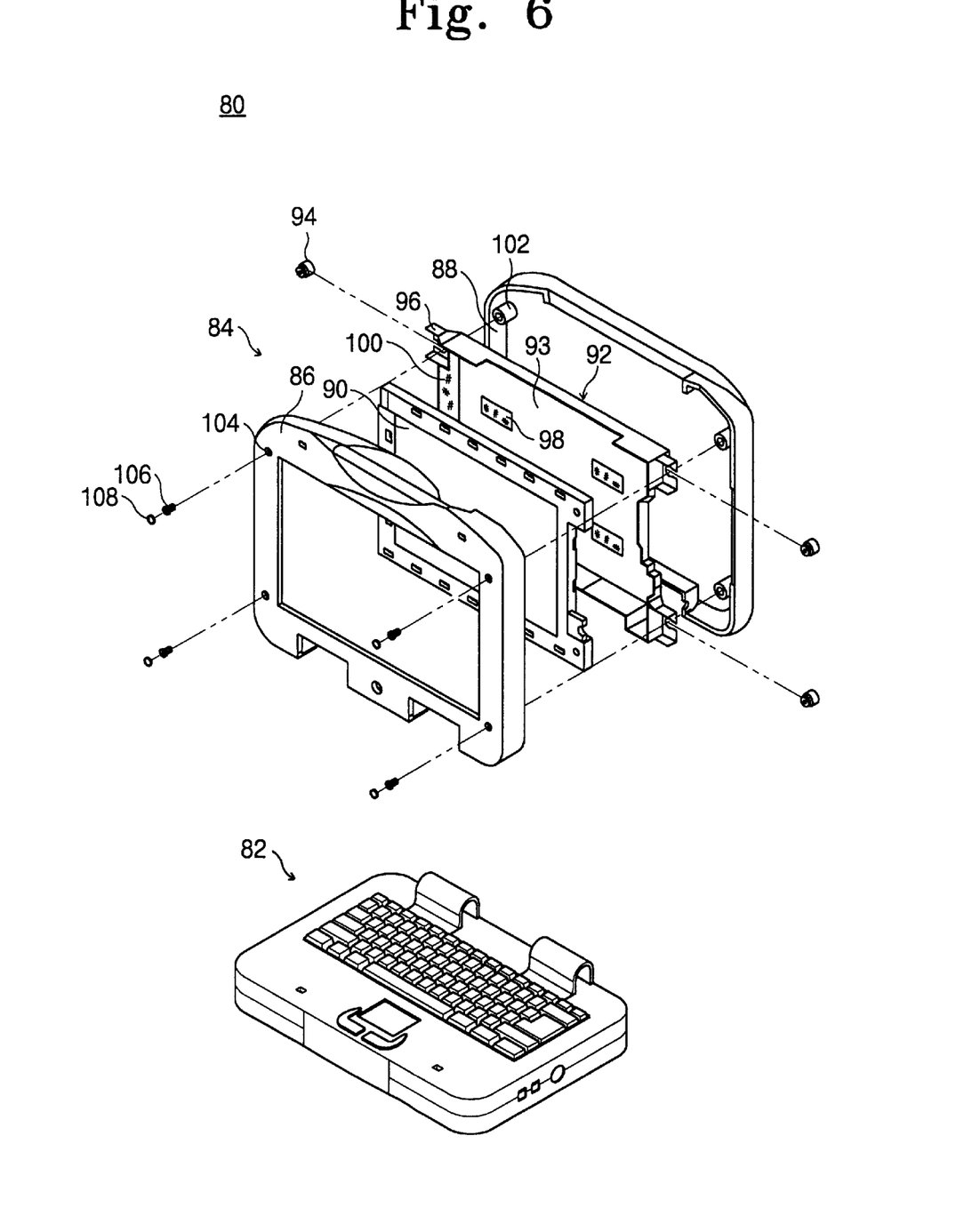
FIG. 6 is an exploded perspective view showing a flat display panel set in the display body of a portable computer using an impact protection structure in accordance with a second embodiment of this invention.
Figure 7:
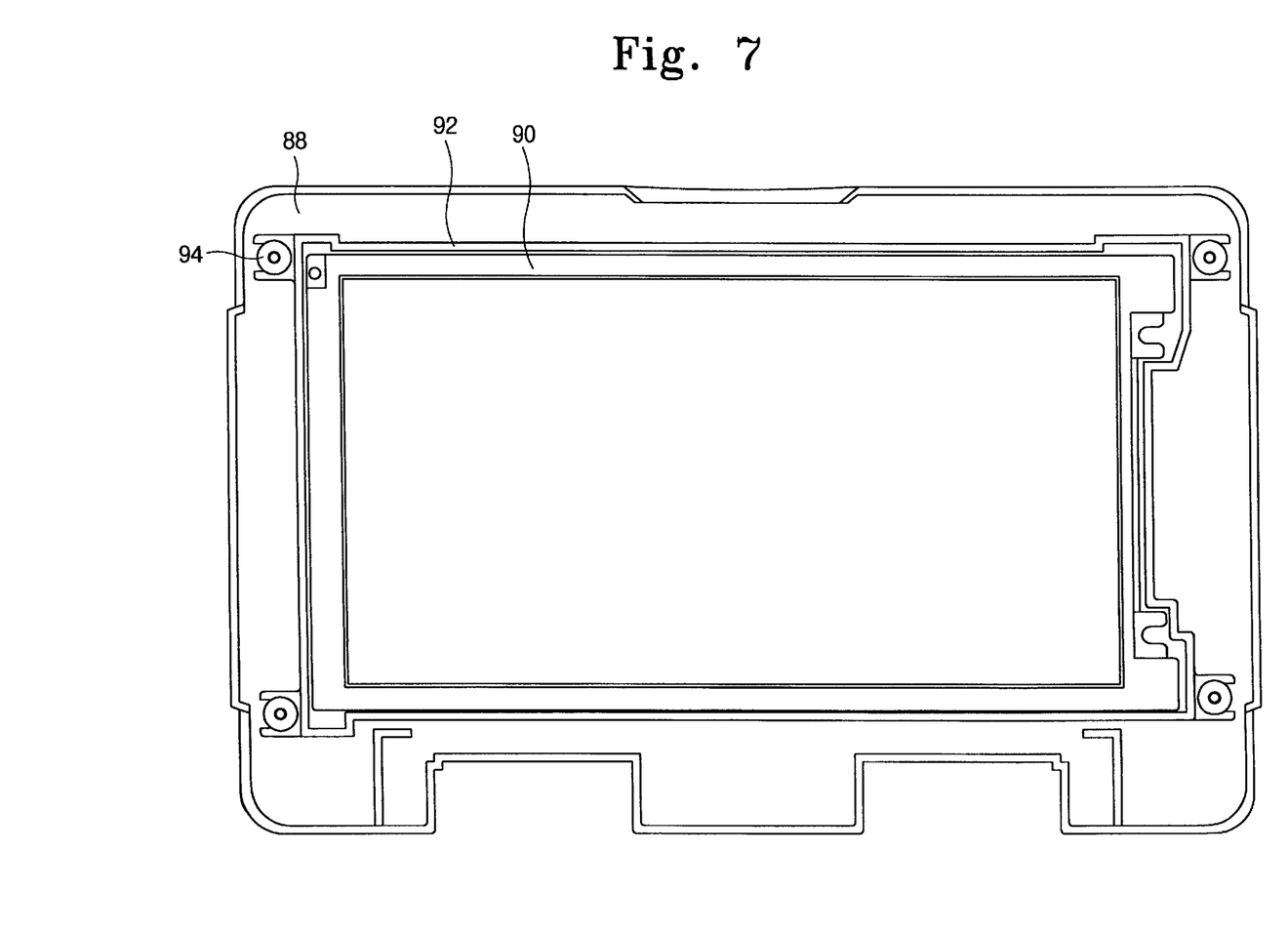
FIG. 7 is a plan view showing the flat display panel, seated in a display protection seat of this invention and mounted to the back housing of the display body of FIG. 6.
Figure 8:
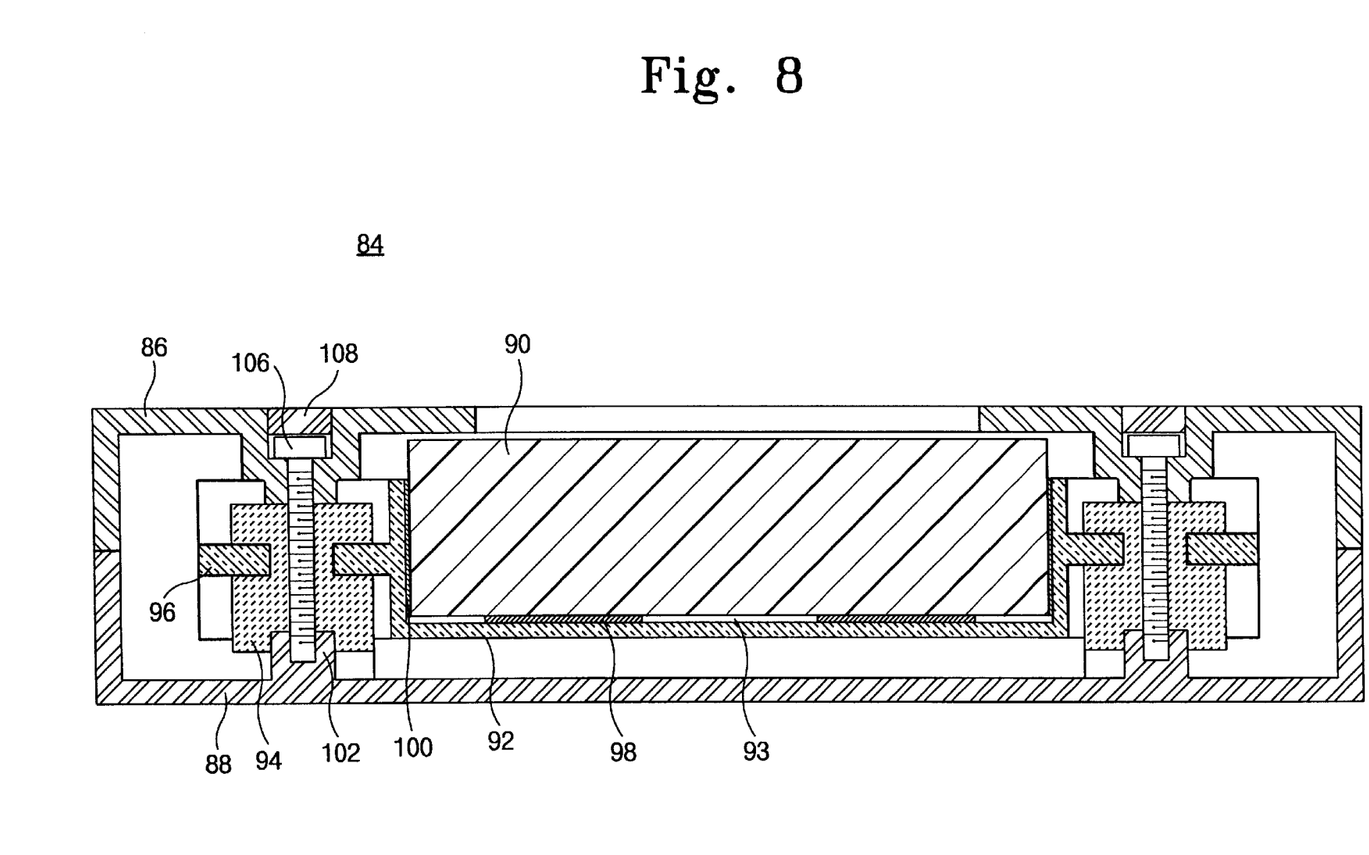
FIG. 8 is a cross-sectioned view showing an assembled structure provided in the display body with the flat display panel being set in the display body.

FIG. 6 is an exploded perspective view showing a flat display panel set in the display body of a portable computer using an impact protection structure in accordance with a second embodiment of this invention. FIG. 7 is a plan view showing the flat display panel, seated in a display protection seat of the above structure and mounted to the back housing of the display body of the portable computer. FIG. 8 is a cross-sectioned view showing an assembled structure provided in the display body, with the flat display panel being set in the display body.

In the embodiment of FIGS. 6 to 8, the above-mentioned impact protection structure for electronic systems is used in a portable computer 80 for protecting a flat display panel 90, set in the display body of the computer, from impact.

As shown in the drawings, the display body 84 of the portable computer 80 comprises two housings: front housing 86 and back housing 88. The front housing 86 forms the front frame of the display body 84, while the back housing 88 is assembled to the back surface of the front housing 86 and forms the back frame of the body 84. An impact protection seat member 92, made of plastic or metal, is closely interposed between the housings 86 and 88. The above seat member 92 is depressed to a depth at its surface facing the front housing 86, thus having an impact protection seat 93. In such a case, a pressure extension may preferably extend from the interior surface of the front housing 86 toward the back housing 88 to a position in the vicinity of the edge of the protection seat 93, thus stably and firmly seating the flat display panel 90 in the protection seat 93.

In order to further improve the impact protection effect of the above structure, a plurality of first cushion members 94, having a cylindrical configuration, are provided on the seat member 92 at positions in the vicinity of locking parts 96 of the seat member 92. In such a case, a plurality of locking members or set screws 106 pass through the locking parts 96 so as to assemble the housings 86 and 88 into a single body. When the front housing 86 and back housing 88 are assembled into a single body through a screwing process, each of the first cushion members 94 is brought into close contact with the interior surfaces of the housings 86 and 88 at both ends thereof. The set screws 106 are inserted into the screw holes 104 of the front housing 86 and pass through the first cushion members 94 prior to being tightened to the interiorly-threaded bosses 102 of the back housing 88. The front housing 86 and back housing 88 are thus integrated into a single member with the impact protection seat member 92 being compressed and stably interposed between the housings 86 and 88.

Since the set screws 106 are inserted into the holes 104 from the outside of the front housing 86, the heads of the screws 106 are exposed to the outside of housing 86, and this spoils the appearance of the portable computer 80. It is, thus, preferable to fit a hole cover 108 into each of the screw holes 104, thereby hiding the heads of the screws 106 from being viewed. On the other hand, in order to further improve the impact protection effect of the structure, second cushion members 98, each having a pad configuration with a predetermined elasticity and thickness, are positioned on the bottom surface of the protection seat 93 of the seat member 92 and cooperate with the first cushion members 94 to more effectively protect the flat display panel 90 from impact. That is, the display panel 90 is seated in the protection seat 93 while being cushioned by the second cushion members 98 positioned between the bottom surface of the seat 93 and the display panel 90. An adhesive layer 100, having a predetermined thickness, is preferably formed along the gap between the side wall of the protection seat 93 and the edge of the display panel 90, thus stably and firmly seating display panel 90 in the seat 93.

Figure 9:
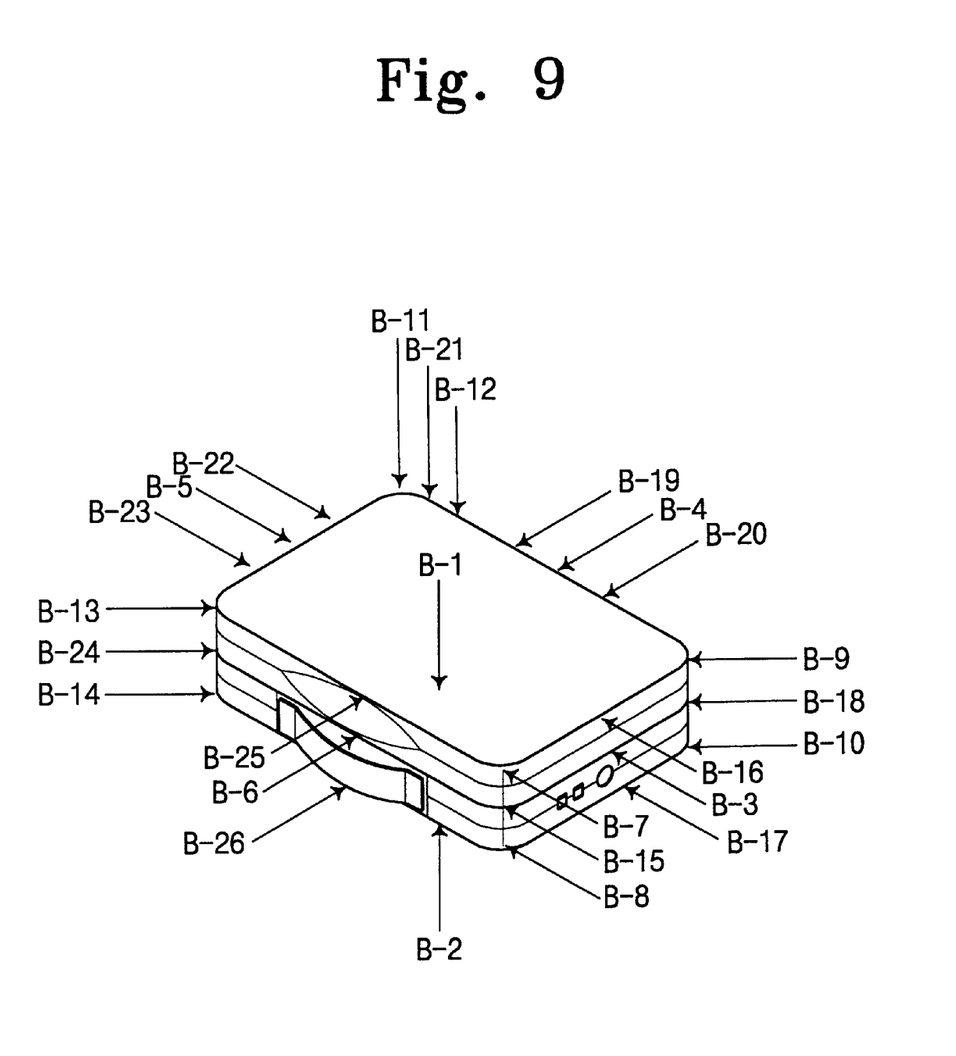
FIG. 9 is a perspective view of a portable computer with the impact protection structure in accordance with this invention, showing the portions of the computer at which the impact resistance is tested.

FIG. 9 is a perspective view of a portable computer with the impact protection structure in accordance with this invention, showing the portions of the computer at which the impact resistance is tested.

In the impact test, a portable computer having a magnesium (Mg) die-cast housing with a weight of 3.15 kg, and being free from being painted, is used. The drop impact test for such a portable computer is performed under the drop test standard MIL-STD-810E METHOD 516.4. In order to measure the drop strength, the portable computer is freely dropped from a height of 4 ft onto a concrete surface covered with a veneer board having a thickness of 5 cm. As shown in FIG. 9, the portable computer is tested on six faces, twelve sides and eight corners thereof during the impact test. The test results are given in Table 2.

TABLE 2

| Impact test results of a portable computer provided with the impact protection structure of this invention | |
|---|---|
| Nos. of tested portions | impact test results |
| B-1 to B-6 (face) | free from any damage |
| B-1 to B-6 (face) | free from any damage |
| B-15 to B-26 (side) | free from any damage |

As explained in the Table 2, the portable computer, provided with the impact protection structure of this invention, effectively protects the flat display panel from impact and prevents the display panel from any damage.

Therefore, those skilled in the art will recognize that the impact protection structure of this invention is effectively used with electronic systems, such as portable computers, when it is necessary to protect impact-sensitive elements of the systems from impact.

As described above, the present invention provides a structure capable of effectively protecting impact-sensitive elements of electronic systems from external impact. The invention also provides a portable computer provided with such a structure for protecting its flat display panel from impact. The impact protection structure of this invention effectively prevents impact-sensitive elements of an electronic system from being damaged by impact so that the invention improves the operational reliability of such electronic systems. Particularly, the structure of this invention effectively protects a flat display panel of a portable computer from impact.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure for protecting electronic systems from impact, comprising:
    a first member;
    a second member;
    a third member interposed between said first and second members and having a depressed seat on a surface thereof facing said first member;
    a fourth member seated in said depressed seat of the third member; and
    at least one locking member assembling said first and second members into a single body while passing through said third member interposed between said first and second members, said third member with said fourth member being supported by said first and second members;
    whereby the structure prevents impact energy from being transmitted to and damaging said fourth member when impacted;
    said structure further comprising:
        at least one first cushion member having an elasticity and provided on said third member at a position proximate to said at least one locking member, said at least one first cushion member being brought into close contact with interior surfaces of said first and second members at both ends thereof, said at least one locking member passing through said first and second members when assembled into said single body;
        wherein said at least one first cushion member has an axial hole formed therein through which said at least one locking member passes; and
        wherein an annular groove is formed on an external surface of said at least one first cushion member, sectioning said at least one first cushion member into upper and lower portions, said at least one first cushion member being fitted into a locking hole of said third member at said annular groove;
        said upper portion of said at least one first cushion member comprising a first contact part having an outer diameter longer than an inner diameter of said locking hole of said third member, said first contact part being brought into close contact with the interior surface of said first member; and
        said lower portion of said at least one first cushion member comprising a second contact part having an outer diameter larger than the inner diameter of said locking hole of said third member said second contact part being brought into close contact with the interior surface of the second member.

2. The structure according to claim 1, further comprising a pressure extension extending from the interior surface of said first member toward said second member to a position proximate to an edge of said depressed seat of said third member, thereby stably and firmly seating said fourth member in said depressed seat.

3. The structure according to claim 1, wherein said first and second members form a housing of said electronic system.

4. The structure according to claim 1, wherein said third member is made of one of a plastic material and a metal material.

5. The structure according to claim 1, wherein said first member is made of a rubber material.

6. The structure according to claim 1, further comprising:
    at least one second cushion member having a predetermined elasticity and thickness and positioned on a bottom surface of said depressed seat of said third member, thereby elastically supporting said fourth member in said depressed seat.

7. The structure according to claim 1, wherein said at least one locking member is inserted into said first member from a point outside of said first member, and passes through said third member prior to being locked to said second member.

8. The structure according to claim 1, wherein said second member includes a boss for receiving said at least one locking member.

9. The structure according to claim 1, wherein said structure comprises a portable computer and said fourth member comprises a display panel thereof.

10. A structure for protecting electronic systems from impact comprising:
    a first member;
    a second member;
    a third member interposed between said first and second members and having a depressed seat on a surface thereof facing said first member;
    a fourth member seated in said depressed seat of the third member; and
    at least one locking member assembling said first and second members into a single body while passing through said third member interposed between said first and second members, said third member with said fourth member being supported by said first and second members;
    whereby the structure prevents impact energy from being transmitted to and damaging said fourth member when impacted;
    said structure further comprising at least one adhesive layer disposed in a gap between a side wall of said depressed step of said third member and said fourth member for securing said fourth member in position in said depressed seat.

11. A portable computer provided with a structure for protecting a display panel from impact, comprising:
    a front housing forming a front frame of a display body of said computer;
    a back housing forming a rear frame of said display body;
    an impact protection seat member interposed between said front and back housings, said seat member having a depressed seat formed on a surface thereof facing said front housing for seating said display panel; and at least one locking member assembling the front and back housings into a single body and passing through said seat member interposed between the front and back housings, said seat member and the display panel being supported by said front and back housings;

whereby the structure prevents impact energy from being transmitted to and damaging the display panel when the portable computer is impacted;

said portable computer further comprising at least one adhesive layer having a predetermined thickness and disposed in a gap between a side wall of said depressed seat and an edge of the display panel, thereby stably and firmly seating the display panel in said depressed seat.

12. The portable computer according to claim 11, further comprising:

at least one first cushion member having an elasticity and provided on said seat member at a position proximate to said at least one locking member, said at least one first cushion member being brought into close contact with interior surfaces of said front and back housings at both ends thereof, said at least one locking member passing through said front and back housings when assembled into said single body.

13. The portable computer according to claim 11, further comprising:

at least one second cushion member having a predetermined elasticity and thickness and positioned on a bottom surface of said depressed seat of said seat member, thereby elastically supporting the display panel in said depressed seat.

14. A structure for protecting a component from impact, comprising:

a first member;

a second member;

a third member interposed between said first and second members and having a depressed seat on a surface thereof facing said first member; and locking means passing through said first, second and third members for locking and first and second members together into a single body with said third member interposed therebetween;

wherein said component is seated in said depressed seat of said third member prior to said locking means locking said first and second members together into a single body;

whereby the structure prevents impact energy from being transmitted to and damaging the component when impacted;

said structure, further comprising:

at least one first cushion member having an elasticity and provided on said third member at a position proximate to said locking means said at least one first cushion member being brought into close contact with interior surfaces of said first and second members at both ends thereof;

wherein said at least one first cushion member has an axial hole formed therein through which said at least one locking member passes, and wherein an annular groove is formed on an external surface of said at least one first cushion member, sectioning said at least one first cushion member into upper and lower portions said at least one first cushion member being fitted into a locking hole of said third member at said annular groove;

said upper portion of said at least one first cushion member comprising a first contact part having an outer diameter longer than an inner diameter of said locking hole of said third member, said first contact part being brought into close contact with the interior surface of said first member; and said lower portion of said at least one first cushion member comprising a second contact part having an outer diameter larger than the inner diameter of said locking hole of said third member, said second contact part being brought into close contact with the interior surface of the second member.

15. The structure according to claim 14, further comprising a pressure extending from the interior surface of said first member toward said second member to a position proximate to an edge of said depressed seat of said third member, thereby stably and firmly seating the component in said depressed seat.

16. The structure according to claim 14, wherein said first and second members form a housing for the component.

17. The structure according to clam 14, wherein said third member is made of one of a plastic material and a metal material.

18. The structure according to claim 14, wherein said first member is made of a rubber material.

19. The structure according to claim 14, further comprising:

at least one second cushion member having a predetermined elasticity and thickness and positioned on a bottom surface of said depressed seat of said third member, thereby elastically supporting the component in said depressed seat.

20. The structure according to claim 14, wherein said locking means comprises at least one locking member which is inserted into said first member from a point outside of said first member, and passes through said third member prior to being locked to said second member.

21. The structure according to claim 20, wherein said second member includes a boss for receiving said at least one locking member.

22. The structure according to claim 14, wherein the component comprises a display panel, said first member comprises a front housing of the display panel, and said second member comprises a rear housing of the display panel.

23. A structure for protecting a component from impact, comprising:

a first member;

a second member;

a third member interposed between said first and second members and having a depressed seat on a surface thereof facing said first member; and locking means passing through said first, second and third members for locking and first and second members together into a single body with said third member interposed therebetween;

wherein said component is seated in said depressed seat of said third member prior to said locking means locking said first and second members together into a single body;

whereby the structure prevents impact energy from being transmitted to and damaging the component when impacted;

said structure further comprising at least one adhesive layer disposed in a gap between a side wall of said depressed step of said third member and the component for securing the component in position in said depressed seat.

* * * * *